United States Patent
Carr

(10) Patent No.: US 6,799,710 B1
(45) Date of Patent: Oct. 5, 2004

(54) BURN PROTECTION ATTACHMENT FOR A SOLDERING TOOL

(76) Inventor: Willie R. Carr, 1410 Holland Dr., Somerset, NJ (US) 08873

( * ) Notice: Subject to any disclaimer, the term of this patent is extended or adjusted under 35 U.S.C. 154(b) by 177 days.

(21) Appl. No.: 10/217,267

(22) Filed: Aug. 13, 2002

(51) Int. Cl.[7] .............................................. B23K 1/002
(52) U.S. Cl. ........................................ 228/51; 219/242
(58) Field of Search ................................ 219/533, 520, 219/229, 227, 233, 236, 237, 238, 239, 242; 228/51, 52, 53, 55, 57, 59; 126/413, 236

(56) References Cited

U.S. PATENT DOCUMENTS

| | | | | |
|---|---|---|---|---|
| 1,457,508 A | * | 6/1923 | Dellman ...................... | 228/53 |
| 3,050,612 A | * | 8/1962 | Eversole ...................... | 219/233 |
| 3,121,781 A | * | 2/1964 | Schoenwald ................. | 219/237 |
| 3,134,884 A | * | 5/1964 | Bean, Jr. ...................... | 219/233 |
| 3,990,623 A | * | 11/1976 | Fortune ........................ | 228/57 |
| 4,045,651 A | * | 8/1977 | Koo ............................. | 219/227 |
| 4,762,979 A | * | 8/1988 | Geoffroi ...................... | 219/242 |
| 4,785,793 A | * | 11/1988 | Oglesby et al. ............. | 126/414 |
| 5,025,973 A | * | 6/1991 | Newton et al. ............... | 228/55 |
| 5,163,600 A | * | 11/1992 | Barbarich et al. ............ | 228/51 |

* cited by examiner

Primary Examiner—Jonathan Johnson

(57) ABSTRACT

A burn protection attachment for a soldering tool for preventing the user from being burned while using the soldering tool. The burn protection attachment for a soldering tool includes a cage member being detachably attached about a portion of a soldering tool; and also includes an elongate tubular member being attached to the cage member and being adapted to receiver a barrel of the soldering tool.

5 Claims, 3 Drawing Sheets

BURN PROTECTION ATTACHMENT FOR A SOLDERING TOOL

BACKGROUND OF THE INVENTION

1. Field of the Invention

The present invention relates to soldering tool burn protection attachments and more particularly pertains to a new burn protection attachment for a soldering tool for preventing the user from being burned while using the soldering tool.

2. Description of the Prior Art

The use of soldering tool burn protection attachments is known in the prior art. More specifically, soldering tool burn protection attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,864,118; 4,045,651; 415,116; Des. 299,208; 5,163,600; and 3,316,385.

While these devices fulfill their respective, particular objectives and requirements, the aforementioned patents do not disclose a new burn protection attachment for a soldering tool. The prior art includes frames being integrally included with the particular soldering tool itself.

SUMMARY OF THE INVENTION

The general purpose of the present invention, which will be described subsequently in greater detail, is to provide a new burn protection attachment for a soldering tool which has many of the advantages of the soldering tool burn protection attachments mentioned heretofore and many novel features that result in a new burn protection attachment for a soldering tool which is not anticipated, rendered obvious, suggested, or even implied by any of the prior art soldering tool burn protection attachments, either alone or in any combination thereof. The present invention includes a cage member being detachably attached about a portion of a soldering tool; and also includes an elongate tubular member being attached to the cage member and being adapted to receiver a barrel of the soldering tool. None of the prior art includes the combination of elements of the present invention which can be easily and conveniently mounted to the soldering tool.

There has thus been outlined, rather broadly, the more important features of the burn protection attachment for a soldering tool in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new burn protection attachment for a soldering tool which has many of the advantages of the soldering tool burn protection attachments mentioned heretofore and many novel features that result in a new burn protection attachment for a soldering tool which is not anticipated, rendered obvious, suggested, or even implied by any of the prior art soldering tool burn protection attachments, either alone or in any combination thereof.

Still another object of the present invention is to provide a new burn protection attachment for a soldering tool for preventing the user from being burned while using the soldering tool.

Still yet another object of the present invention is to provide a new burn protection attachment for a soldering tool that is easy and convenient to fasten to the main body of a soldering tool.

Even still another object of the present invention is to provide a new burn protection attachment for a soldering tool that is universally attachable to soldering guns.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
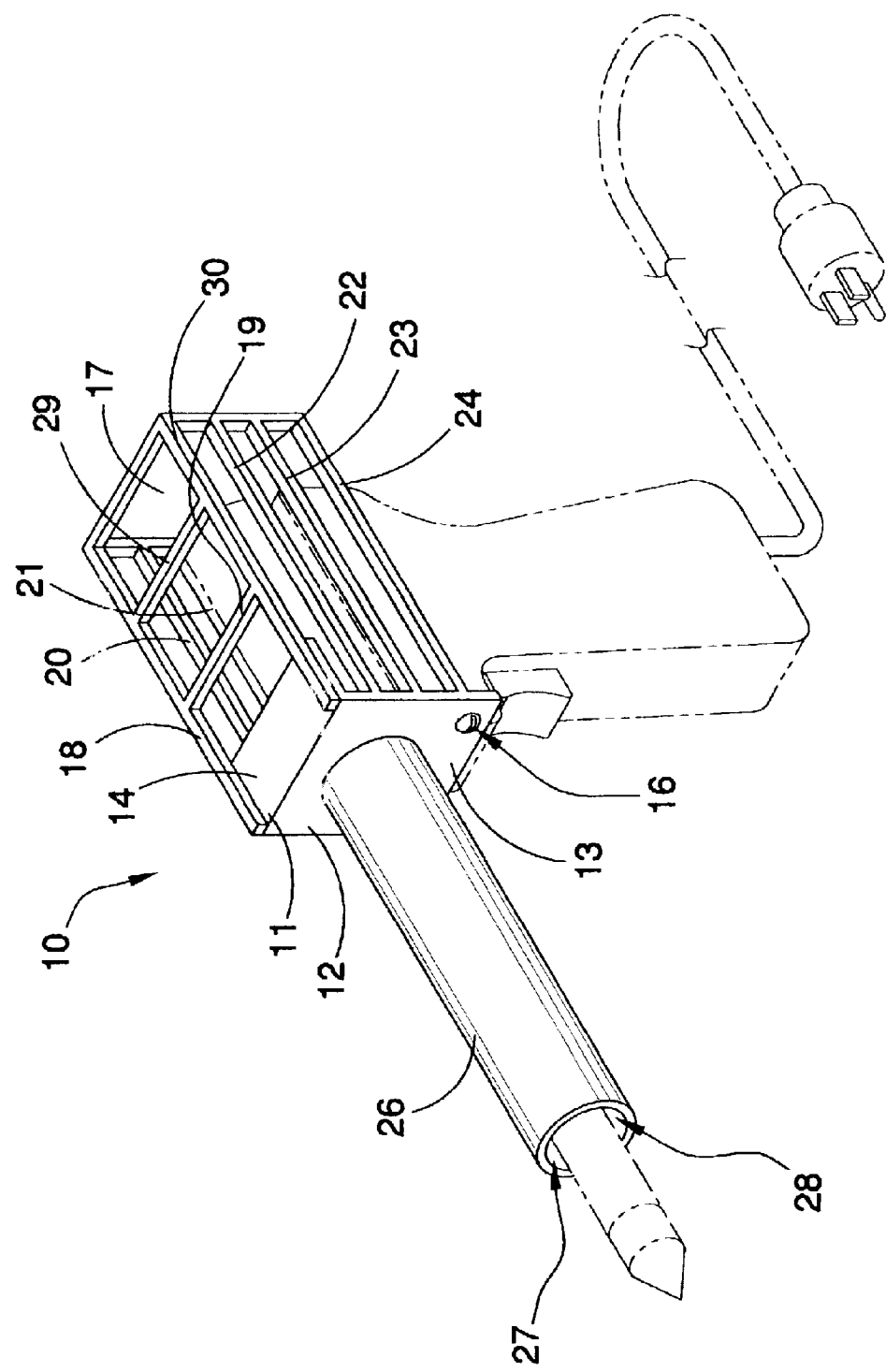
FIG. 1 is a perspective view of a new burn protection attachment for a soldering tool according to the present invention.
Figure 2:
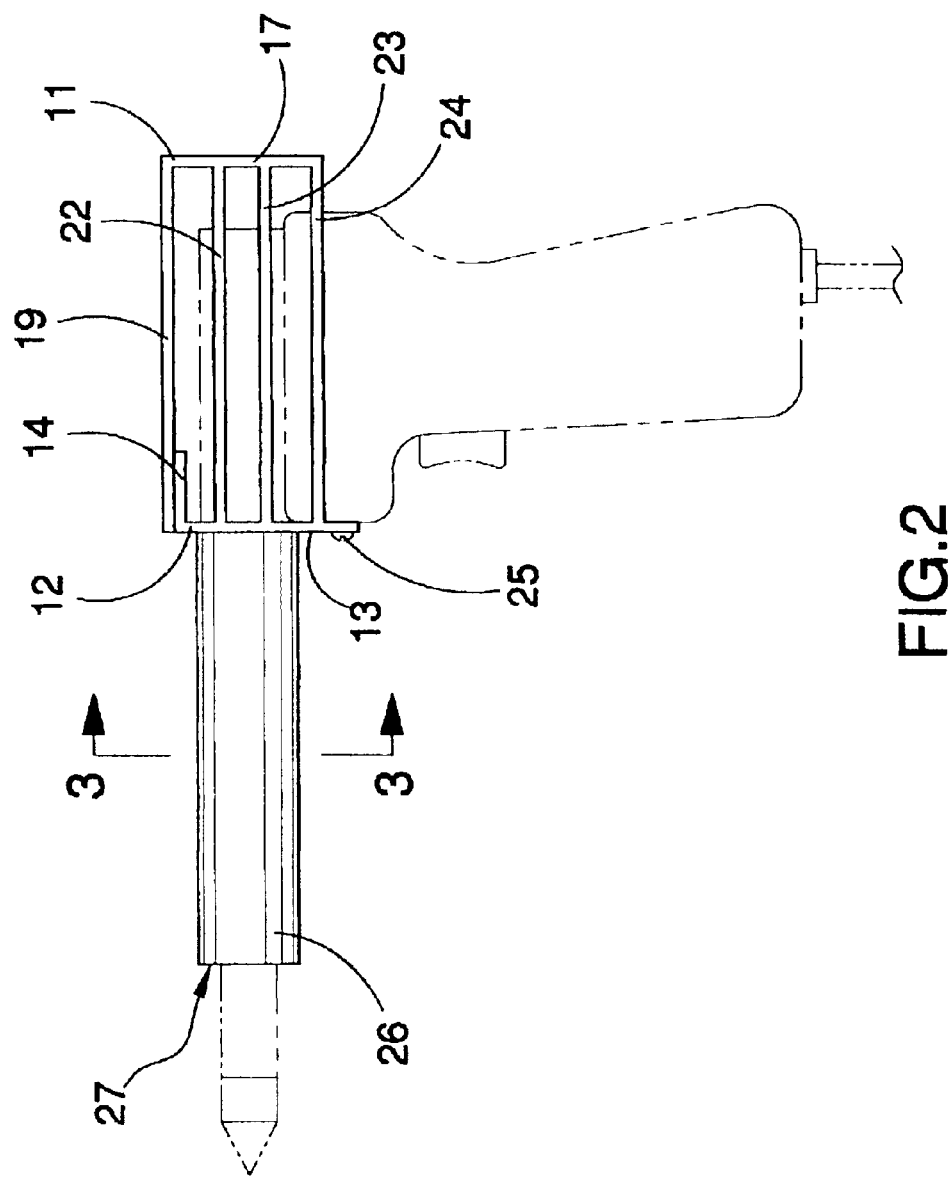
FIG. 2 is a side elevational view of the present invention.
Figure 3:
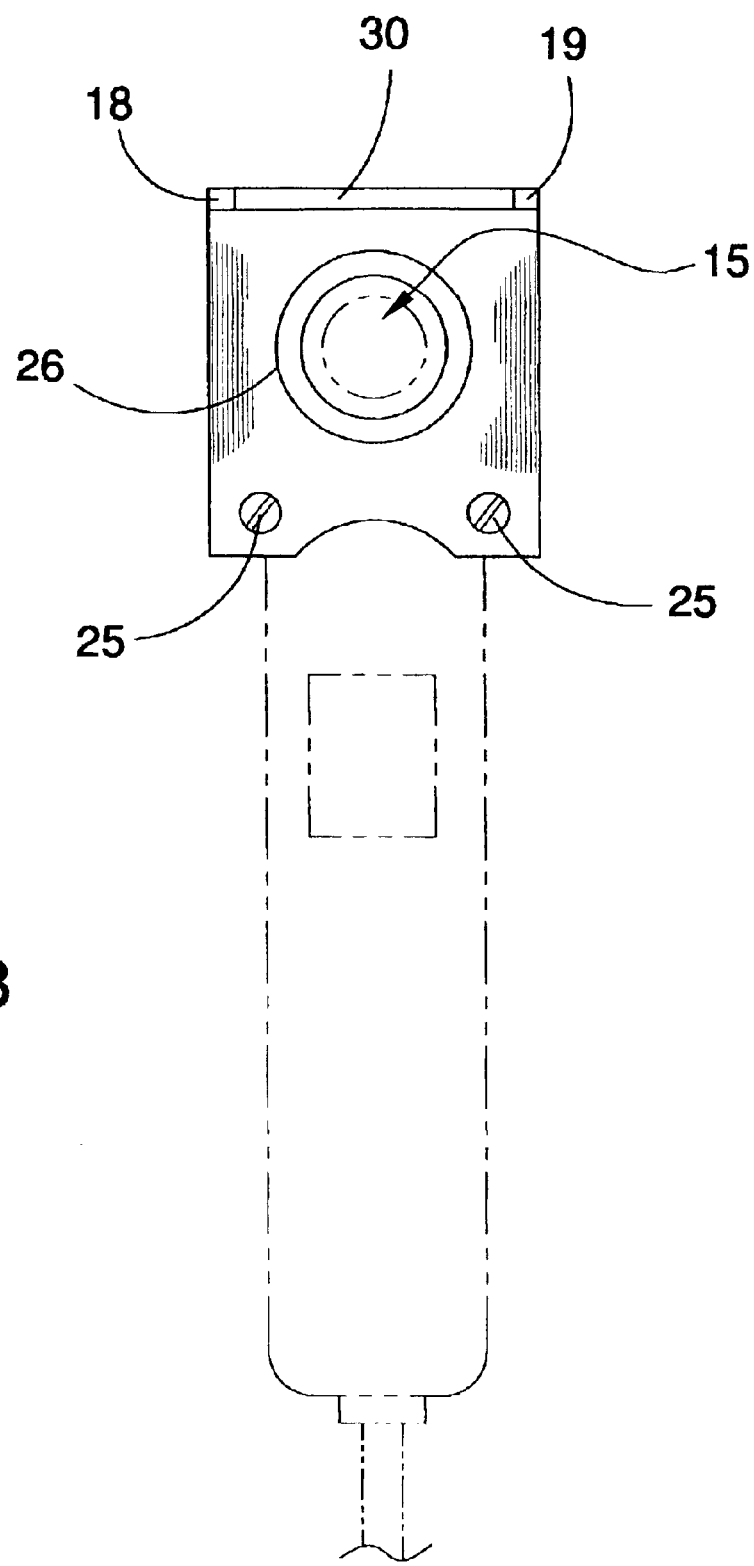
FIG. 3 is a front elevational view of the present invention.

With reference now to the drawings, and in particular to FIGS. 1 through 3 thereof, a new burn protection attachment for a soldering tool embodying the principles and concepts of the present invention and generally designated by the reference numeral 10 will be described.

As best illustrated in FIGS. 1 through 3, the burn protection attachment for a soldering tool 10 generally comprises a cage member 11 being detachably attached about a portion of a soldering tool. The cage member 11 includes a front wall 12 and a back wall 17 being spaced from the front wall 11, and also includes vents 18–24,29,30 conventionally interconnecting the front and back walls 11,17 to allow heat from the soldering tool to escape. The front wall 11 has a main portion 12 and an upper portion 13 which is angled relative to the main portion 12, and further has an opening 15 being centrally disposed therethrough, and also has mounting holes 16 being disposed near corners thereof and being adapted to receive fasteners 25 for fastening the cage member 11 to a main body of the soldering tool. The vents 18–24,29,30 include a plurality of bar members 18–24 extending between and conventionally interconnecting the front and back walls 11,17, and also being spaced apart. The bar members 18,24 include top bar members 18,19 which are conventionally attached to top corners of the front and back walls 11,17, and also include side bar members 20–24 which are conventionally attached to side edges of the front and back walls 11,17. The vents 18–24, 29,30 also include cross members 29,30 being spaced apart and conventionally interconnecting the top bar members 18,19 for supporting the cage member 11 upon the soldering tool.

An elongate tubular member 26 is conventionally attached and welded to the cage member 11 and is adapted to receiver a barrel of the soldering tool. The elongate tubular member 26 has open ends 27 and a bore 28 extending therethrough and is securely attached to and extending forwardly of the front wall 11 with the bore 28 being aligned with the opening 15 through the front wall 11.

In use, the user places the cage member 11 about the main body or housing of the soldering tool with the barrel of the soldering tool being extended through the elongate tubular member 26. The user then secures the cage member 11 to the soldering tool using the fasteners 25. The user can grasp about the cage member 11 and the elongate tubular member 26 without burning oneself on the heating element of the soldering tool.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the burn protection attachment for a soldering tool. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A burn protection attachment for a soldering tool comprising:

a cage member being detachably attached about a portion of a soldering tool, said cage member including a front wall and a back wall being spaced from said front wall, and also including vents interconnecting said front and back walls to allow heat from the soldering tool to escape, said front wall having a main portion and an upper portion which is angled relative to said main portion, and further having an opening being centrally disposed therethrough, and also has having mounting holes being disposed near corners thereof and being adapted to receive fasteners for fastening said cage member to a main body of the soldering tool; and an elongate tubular member being attached to said cage member and being adapted to receive a barrel of the soldering tool.

2. A burn protection attachment for a soldering tool as described in claim 1, wherein said vents include a plurality of bar members extending between and interconnecting said front and back walls, and also being spaced apart.

3. A burn protection attachment for a soldering tool as described in claim 2, wherein said bar members include top bar members which are attached to top corners of said front and back wall, and also include side bar members which are attached to side edges of said front and back walls.

4. A burn protection attachment for a soldering tool as described in claim 3, wherein said vents also include cross members being spaced apart interconnecting said top bar members.

5. protection attachment for a soldering tool as described in claim 4, wherein said elongate tubular member has open ends and a bore extending therethrough and is securely attached to and extending forwardly of said front wall with said bore being aligned with said opening through said front wall.

* * * * *